United States Patent
Omran et al.

(10) Patent No.: US 12,479,742 B1
(45) Date of Patent: Nov. 25, 2025

(54) NANOCOMPOSITES FOR PHOTODEGRADATION OF CONTAMINANTS

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/074,652

(22) Filed: Mar. 10, 2025

(51) Int. Cl.
| | |
|---|---|
| *C02F 1/30* | (2023.01) |
| *B01J 20/02* | (2006.01) |
| *B01J 20/04* | (2006.01) |
| *B01J 20/08* | (2006.01) |
| *B01J 23/34* | (2006.01) |
| *B01J 27/24* | (2006.01) |
| *B01J 35/61* | (2024.01) |
| *B01J 20/28* | (2006.01) |
| *B01J 35/39* | (2024.01) |
| *C02F 101/30* | (2006.01) |

(52) U.S. Cl.
CPC ............ *C02F 1/30* (2013.01); *B01J 20/0248* (2013.01); *B01J 20/0259* (2013.01); *B01J 20/041* (2013.01); *B01J 20/08* (2013.01); *B01J 23/34* (2013.01); *B01J 27/24* (2013.01); *B01J 35/613* (2024.01); *B01J 20/28069* (2013.01); *B01J 20/28083* (2013.01); *B01J 35/39* (2024.01); *B01J 2235/15* (2024.01); *C02F 2101/30* (2013.01); *C02F 2305/10* (2013.01)

(58) Field of Classification Search
USPC .......... 210/660–808; 252/175–181; 502/400, 502/414–418, 420, 423, 427
See application file for complete search history.

(56) References Cited

U.S. PATENT DOCUMENTS

| | | | |
|---|---|---|---|
| 2023/0330844 A1 | 10/2023 | Faisal et al. | |
| 2024/0117147 A1 | 4/2024 | Xu et al. | |

FOREIGN PATENT DOCUMENTS

| | | |
|---|---|---|
| CN | 112473656 A | 3/2021 |
| CN | 113042084 B | 5/2022 |

OTHER PUBLICATIONS

Shunmugakani et al. (Inorganic Chemistry Communications, 2024, 168, 112909). (Year: 2024).*

(Continued)

*Primary Examiner* — Clare M Perrin
(74) *Attorney, Agent, or Firm* — Oblon, McClelland, Maier & Neustadt, L.L.P.

(57) ABSTRACT

A method of photodegrading an organic compound may include irradiating, in the presence of the organic compound, a nanocomposite including graphitic $C_3N_4$, $MnO_2$, and $MgAl_2O_4$ in a mass relationship to each other in a range of from 5 to 15:2 to 7:75 to 95, at a temperature in a range of from 10° C. to 80° C. in a contaminated volume of water, thereby photodegrading the organic compound to partially decompose the organic compound and at least partially decontaminate the contaminated volume of water.

18 Claims, 6 Drawing Sheets

(56) References Cited

OTHER PUBLICATIONS

Salmasi et al. (Applied Surface Science, 2022, 585, 152615). (Year: 2022).*

S. Panimalar, et al., "Studies of MrO2/g-C3N4 hetrostructure efficient of visible light photocatalyst for pollutants degradation by sol-gel technique", Surfaces and Interfaces, vol. 20, Sep. 2020 (6 pages).

E. Prabakaran, et al., "Preparation of Z-Scheme G-C3n4/Mno2 nanocomposite with enhanced photocatalytic degradation of brilliant green dye under visible light irradiation", University of Johannesburg, Aug. 29, 2024, pp. 1-31 (31 pages).

* cited by examiner

NANOCOMPOSITES FOR PHOTODEGRADATION OF CONTAMINANTS

BACKGROUND

Technical Field

The present disclosure is directed towards chemical degradation of contaminants in effluent streams, and more particularly, relates to a method of removing pollutants from contaminated water by photodegrading an organic compound.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Wastewater generation brought on by industrialization has resulted in increased environmental pollution. The environmental pollution caused by both inorganic and organic contaminants presents a serious threat to ecosystems and human health. Among these contaminants, heavy metal ions are particularly hazardous due to their extreme toxicity, carcinogenic nature, and non-biodegradability. Heavy metal pollution is primarily an outcome of anthropogenic activities, including a plurality of industries such as chemical, textile, leather, and plastic manufacturing, as well as mining, battery production, paint and pigment manufacturing, and paper and pulp production. A plurality of heavy metals such as cadmium (Cd), chromium (Cr), copper (Cu), iron (Fe), lead (Pb), nickel (Ni), silver (Ag), zinc (Zn), and uranium (U) are commonly found in industrial wastewater. Among these, copper exists in particularly high concentrations due to its extensive use in engineering applications, including metal finishing, electroplating, and etching. The need for efficient, sustainable, and cost-effective adsorbent materials to remove such pollutants has led to the exploration of novel materials with superior properties. An uncontrolled discharge of toxic metals into effluents and water streams without appropriate treatment leads to significant environmental degradation and poses severe health risks to biotic systems. Toxic metals may accumulate in living organisms through the food chain, leading to severe medical conditions such as cancer, nervous system damage, and kidney failure, which can ultimately be fatal at elevated levels.

In order to address detrimental effects of heavy metal pollution, a plurality of remediation techniques have been developed, including ion exchange, chemical precipitation, coagulation, membrane filtration, reverse osmosis, and adsorption methods. Among the aforementioned, adsorption techniques have garnered considerable attention due to desirable removal efficiency, even for trace amounts of metal ions, cost-effectiveness, and simplicity compared to conventional methods. However, existing adsorption techniques suffer from one or more limitations, including low adsorption capacities, high operational costs, complex regeneration procedures, and limited selectivity for specific metal ions. Moreover, methods such as ion exchange and reverse osmosis, while effective, require high maintenance and produce secondary waste streams that necessitate further treatment.

Graphite-phase carbon nitride (g-$C_3N_4$) has emerged as a desirable material due to certain characteristics, including cost-effectiveness, metal-free nature, chemical and thermal stability, visible light responsiveness, non-toxic properties, and ease of preparation, as described by Singh, D., and coworkers, Citric acid coated magnetic nanoparticles: synthesis, characterization and application in removal of Cd (II) ions from aqueous solution. Journal of water process engineering, which is incorporated by reference herein. However, g-$C_3N_4$ also presents certain drawbacks, such as a low specific surface area, rapid recombination of electron-hole pairs, and difficulties in exfoliation, limiting its adsorption efficiency. To overcome the above listed limitations, modifications such as microstructural design alterations and heteroatom doping have been explored. The infusion of g-$C_3N_4$ nanosheets with metal nanoparticles has been evaluated to prevent sheet aggregation, thereby increasing the specific surface area and enhancing adsorption performance. Certain research has demonstrated the effectiveness of composite materials such as MgY$_2$O$_4$-g-$C_3N_4$, Ox-g-$C_3N_4$/Pani-NF, and CoFe$_2$O$_4$-g-$C_3N_4$ for copper ion removal, as well as CdS/g-$C_3N_4$, Y$_2$O$_3$@g-$C_3N_4$, and ZnO-g-$C_3N_4$ for cadmium ion elimination. Additionally, metal oxides have been reported to enhance pore volume and average pore size, further improving adsorption efficiency, as described by Sharma and co-workers in *Mater. Res. Innov.* 2022, 26(2), 65-75, and Li and co-workers in *J. Mater. Chem. A* 2021, 9(26), 15019-15026, which is incorporated by reference herein.

Furthermore, carbon nanomaterials offer distinct advantages, including a high specific surface area that increases contact with electrolytes and enhances adsorption and charge storage capabilities. Carbon nanomaterials exhibit high electrical conductivity, which is crucial for efficient charge-discharge processes, as well as chemical stability, making carbon nanomaterials suitable for environmental applications, as described by Ibrahim and co-workers in *Surfaces* 2024, 7(3), 493-507, which is incorporated by reference herein. The cost-effectiveness and environmentally friendly nature further support viability as adsorbent materials. Moreover, integrating carbon nanomaterials with metal films or graphene has shown promise in enhancing energy density and performance in supercapacitor applications, as described by Khairy and co-workers in *Molecules* 2024, 29(9), 2082, which is incorporated by reference herein. Compared to activated carbon, g-$C_3N_4$ exhibits superior photocatalytic properties under visible light, permitting it to harness solar energy for charge storage and providing a sustainable energy source. Additionally, g-$C_3N_4$ has a narrower bandgap than activated carbon, enabling broader light absorption and higher energy conversion efficiency. Structural modifications, including carbon-defect engineering and two-dimensional design alterations, have further enhanced a performance of g-$C_3N_4$ by increasing surface area and porosity of the compound, both of which are critical for efficient charge storage and adsorption.

However, despite the aforementioned advancements, there remains a significant requirement for improved materials that offer higher adsorption capacity, enhanced selectivity, and better regeneration potential. The present disclosure aims to addresses these challenges.

Accordingly, one object of the present disclosure is to provide method of photodegrading an organic compound, that may circumvent the drawbacks and limitations such as high cost, environmental concerns, and complex synthesis procedures, of methods and materials known in the art.

SUMMARY

In an exemplary embodiment, a method of photodegrading an organic compound may include irradiating, in the presence of the organic compound, a nanocomposite including graphitic $C_3N_4$, $MnO_2$, and $MgAl_2O_4$ in a mass relationship to each other in a range of from 5 to 15:2 to 7:75 to 95, at a temperature in a range of from 10° C. to 80° C. in a contaminated volume of water, thereby photodegrading the organic compound to partially decompose the organic compound and at least partially decontaminate the contaminated volume of water.

The average pore distribution of the nanocomposite may be unimodal. The (Brunauer-Emmett-Teller) BET specific surface area of the nanocomposite may be in a range of from 16.2 $m^2/g$ to 20.2 $m^2/g$ (18.7 $m^2/g$). The average pore diameter of the nanocomposite, according to (Barrett-Joyner-Halenda) BJH measurement method, may be in a range of 5 to 15 nanometers (nm) (8.34 nm). The average pore volume of the nanocomposite, according to the BJH measurement method, may be in a range of from 0.025 $cm^3/g$ to 0.075 $cm^3/g$ (0.05 $cm^3/g$).

The nanocomposite may have a (220) spinel interplanar spacing in a range of from 0.258 to 0.338 nm (e.g., 0.298 nm), (400) spinel interplanar spacing in a range of from 0.165 to 0.245 nm (e.g., 0.205 nm), (002) $MnO_2$ interplanar spacing in a range of from 0.106 to 0.186 nm (e.g., 0.146 nm), and/or (211) $Al_2O_3$ interplanar spacing in a range of from 0.093 to 0.173 nm (e.g., 0.133 nm), according to selected area diffraction (SAED).

The mass relationship of the nanocomposite may be in a range of from 9 to 11:4 to 6:84 to 86, where the nanocomposite may have a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to SAED. An X-ray diffraction (XRD) spectrum of the nanocomposite under Cu-filtered Cu-K$\alpha$ radiation (1.5418 Å) powered at 45 kV and 10 mA may have 2θ peaks of an $MnO_2$ pyrolusite phase at 28.4±1°, 40.5±1°, 44.9±1°, 56.0±1°, 66.4±1°, and/or 79.1±1°, an $MgAl_2O_4$ spinel phase at 19.1±1°, 31.3±1°, 44.8±1°, 56.1±1°, 59.5±1°, 74.09±1°, and/or 78.1±1°, an MgO cubic phase at 42.8±1°, 62.2±1°, and/or 74.6±1°, an $Al_2O_3$ phase at 31.3±1°, 34.3±1°, and/or 61.6±1°, and/or g-$C_3N_4$-related diffractions at 18.8±1°, 28.2±1°, 35.5±1°, 40.7±1°, 44.6±1°, and/or 73.7±1°. No more than 5% relative intensity of any other phase may be detected in the XRD spectrum.

The irradiating may include exposing the nanocomposite to sunlight under ambient temperature and pressure, wherein UV-vis spectroscopy, the nanocomposite may have a highest intensity absorbance maximum in a range of from 200 to 250 UV-vis as an absorption band spanning from less than 200 nm to more than 800 nm, and the nanocomposite may have a bandgap energy in a range of from 2.5 electron volts (eV) to 3.3 eV (e.g., 2.9 eV).

The nanocomposite may have no more than 0.1 parts, individually, of thiol, amine, carboxylate, and hydroxyl functionalization per 100 $MnO_2$ units, relative to a total metal oxide weight.

The nanocomposite may include no more than 1 wt. %, individually or in any combination, of $TiO_2$, $Ti_2AlN$, $Fe_3O_4$, AlN, ZnO, and/or $SiO_2$, relative to a total metal oxide weight.

The nanocomposite may include no more than 1 atoms of Ce, relative to 100 atoms of Mn.

The carbon materials in the nanocomposite may include no more than 1 wt. %, individually, carbon nanotubes or carbon dots, relative to total nanocomposite weight.

The nanocomposite may have no more than 1 wt. % AgBr, relative to a total metal oxide weight, and the nanocomposite no more than 1 wt. % tungsten oxide, relative to a total nanocomposite weight.

The nanocomposite may include no more than 1 wt. % Co, relative to total nanocomposite weight.

The nanocomposite may include no more than 1 wt. %, individually or together, CuO and $WO_3$, relative to total nanocomposite weight.

The nanocomposite may include no more than 1 wt. %, individually or together, elemental state Co and Fe, relative to total nanocomposite weight.

The nanocomposite may include no more than 0.1 wt. % of any noble metal, relative to total nanocomposite weight.

The nanocomposite may include no more than 10 wt. % MgO, relative to a total metal oxide weight, and the nanocomposite may include no clay.

The nanocomposite obtained may include no more than 1 wt. % carbonaceous material besides the graphitic carbon nitride. The graphitic $C_3N_4$ need not be nitrogen deficient. The carbon materials in the nanocomposite may include no more than 0.01 wt. % nanotubes and/nanorods, or none of either or both, relative to total nanocomposite weight.

The nanocomposite may include no more than 10 wt. % $Mn_3O_4$, relative to total manganese oxide weight, and the nanocomposite may include no more than 1 wt. % V-doped ZnO, relative to total nanocomposite weight.

Relative to a total metal oxide weight, the nanocomposite may include no more than 1 wt. %, individually or in any combination/together, of $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and/or $LaFeO_3$.

The graphitic $C_3N_4$ in the nanocomposite may consist essentially of sheet morphologies, e.g., such that the bandgap energy is changed by no more than 5% relative to a pure sheet morphology nanocomposite. The graphitic $C_3N_4$ in the nanocomposite may include no more than inevitable traces of boron.

The nanocomposite may include no more than 10 wt. %, individually or in any combination, relative to total metal content, of any of Zn, Ce, Gd, La, Ba, Ti, Ca, Sr, Zr, Pb, Ni, Ag, Co, Cu, Mn, Cd, W, Ta, Nb, Pr, and/or Bi, and the nanocomposite may include no more than 1 wt. %, individually or in any combination, relative to total carrier weight, of $SiO_2$, $TiO_2$, ZnO, and/or ZnS.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (C)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3$/g) and is an important parameter in characterizing the porous structure of materials, such as adsorbents or catalysts.

As used herein, the term 'photodegradation' refers to the process by which a material undergoes chemical breakdown or alteration due to exposure to light. This process typically results in the breaking of molecular bonds within the material, leading to the formation of new compounds or the degradation of its physical and chemical properties.

As used herein, the term 'contaminants' refer to the harmful substances or contaminants that degrade the quality of water, air, soil, or food, making them unsafe or unsuitable for specific uses. In water, contaminants include biological agents like bacteria, viruses, and parasites; chemical substances such as heavy metals, pesticides, pharmaceuticals, and industrial chemicals; and physical materials like dirt, debris, and sediment. These contaminants can pose serious risks to human health, the environment, and ecosystems, depending on their type, concentration, and exposure levels.

As used herein, the term 'organic contaminants' refers to carbon-based compounds, typically derived from industrial, agricultural, or domestic activities, that are present as contaminants in water or the environment. These contaminants may include pesticides, pharmaceuticals, dyes, and other synthetic or natural organic substances that can pose environmental or health risks.

The organic contaminant may be a dye, a phenol, a polycyclic aromatic hydrocarbon, an herbicide, a pesticide, a persistent organic contaminant, or the like.

The organic contaminant may be a dye. A dye is a colored substance that chemically binds to a material it may be intended to color. Generally, a dye may be applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthraquinone and its derivatives such as acid blue 25, alizarin, anthrapurpurin, carminic acid, 1,4-diamino-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarin green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH- EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanole, and xylenol orange; azo dyes such as acid orange 5, acid red 13, alcian yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysonine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azine dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythrosine, fluorescein, rhodamine B, rose bengal, and Texas red; fluorine dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxylenol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, metsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thifensulfuron, tribenuron, imazamox, imazaquin, flumetsulam, cloransulam, thiencarbazone, fluroxypyr, diflufenzopyr, atrazine, simazine, metribuzin, bromoxynil, bentazon, linuron, glufosinate, clomazone, isoxaflutole, topramezone, mesotrione, tembotrione, acifluorfen, fomesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses. A pesticide intended for use against algae is known as an algicide. Examples of algicides include benzalkonium chloride, bethoxazin, cybutryne, dichlone, dichlorophen, diuron, endothal, fentin, isoproturon, methabenzthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, ceftazidime, ceftibuten, ceftizoxime, moxalactam, ceftriaxone, cefepime, ceftaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidaxomicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciprofloxacin, enoxacin, gatifloxacin, gemifloxacin, levofloxacin, lomefloxacin, moxifloxacin, nadifloxacin, nalidixic acid, norfloxacin, ofloxacin, trovafloxacin, grepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, folpet, fthalide, furalaxyl, guazatine, hexaconazole, hymexazole, imazalil, imibenconazole, iminoctadine, iodocarb, ipconazole, iprobenfos, iprodione, iprovalicarb, isofetamid, isoprothiolane, isotianil, kasugamycin, laminarin, mancozeb, mandestrobin, mandipropamid, maneb, mepanipyrim, mepronil, meptyldinocap, metalaxyl, metominostrobin, metconazole, methasulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazoate, penconazole, pencycuron, penflufen, penthiopyrad, phenamacril, picarbutrazox, picoxystrobin, piperalin, polyoxin, probenazole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, tecloftalam, tecnazene, terbinafine, tetraconazole, thiabendazole, thifluzamide, thiophanate, thiram, tiadinil, tolclofos-methyl, tolfenpyrad, tolprocarb, tolylfluanide, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above. A pesticide intended for use against insects is known as an insecticide. Examples of insecticides are: organochlorides such as Aldrin, chlordane, chlordecone, DDT, dieldrin, endosulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorous, dicrotophos, dimethoate, disulfoton, ethoprop, fenamiphos, fenitrothion, fenthion, malathion, methamidophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothianidin, imidacloprid, nithiazine, thiacloprid, and thiamethoxam; ryanoids such as chlorantraniliprole, cyantraniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluoroacetamide, phosacetim, pyrinuron, scilliroside, strychnine, tetramethylenedisulfotetramine, bromethalin, 2,4-dinitrophenol, and uragan D2. A pesticide intended for use against viruses is known as a virucide. Examples of virucides are cyanovirin-N, griffithsin, interferon, NVC-422, scytovirin, unruin, virkon, zonroz, and V-bind viricide.

A persistent organic contaminant may be a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing may be crucial for understanding the material's structural properties and is typically measured using X-ray diffraction (XRD) techniques.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material. In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure is directed to a method of forming a nanocomposite of graphitic carbon nitride (g-$C_3N_4$), manganese oxide ($MnO_2$), and magnesium aluminate ($MgAl_2O_4$) (g-$C_3N_4$@ $MnO_2$/$MgAl_2O_4$). Each component of the nanocomposite, when used in appropriate ratios, may be effective in the removal of organic contaminants in water with high efficiency and removal activity.

A nanocomposite (g-$C_3N_4$@ $MnO_2$/$MgAl_2O_4$) including g-$C_3N_4$, $MnO_2$, and $MgAl_2O_4$ may include coating of g-$C_3N_4$ on $MnO_2$ and $MgAl_2O_4$. The g-$C_3N_4$, $MnO_2$, and $MgAl_2O_4$ are present in the nanocomposite in a mass relationship to each other in a range of from 5 to 15:2 to 7:75 to 95, preferably 7 to 13:3 to 6:80 to 90, and preferably 9 to 11:4 to 5:84 to 86. The g-$C_3N_4$, $MnO_2$, and $MgAl_2O_4$ may be present in the nanocomposite in a mass relationship to each other of 10:5:85, while tolerable variations of any of these values may be ±2.5, 2, 1.5, 1, 0.75, 0.5, 0.25, 0.1, 0.5, or 0.1. The nanocomposite can exhibit excellent performance in photodegradation of organic pollutants, hydrogen generation, and anticancer activity. The material can demonstrate enhanced catalytic properties, high surface reactivity, and efficient adsorption, making it suitable for applications in environmental remediation, energy production, and biomedical treatments.

The nanocomposite may include g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may include 10±3.33, 2.5, 2, 1.5, 1, 0.75, 0.67, 0.5, 0.33, 0.25, 0.125, 0.1, 0.05, or 0.01 wt. % of graphite-phase carbon nitrides (g-$C_3N_4$).

The nanocomposite may include $MnO_2$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. The nanocomposite may include 5±1.5, 1, 0.75, 0.67, 0.5, 0.33, 0.25, 0.125, 0.1, 0.05, or 0.01 wt. % of $MnO_2$.

The nanocomposite may include magnesium aluminum oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. The nanocomposite may include 85±7.5, 6.67, 6, 5, 4, 3.33, 2.5, 2, 1.5, 1, 0.75, 0.67, 0.5, 0.33, 0.25, 0.125, 0.1, 0.05, or 0.01 wt. % of magnesium aluminum oxide ($MgAl_2O_4$).

The nanocomposite obtained may include no more than 0.1, 0.075, 0.05, 0.025, 0.01, 0.001, 0.0001, or 0.00001 parts, individually, of thiol, amine, carboxylate, and hydroxyl functionalization per 100 $MnO_2$ units, relative to a total metal oxide weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or in any combination, of $TiO_2$, $Ti_2AlN$, $Fe_3O_4$, $AlN$, $ZnO$, and/or $SiO_2$, relative to a total metal oxide weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably less than 0.01 wt. % inevitable traces carbon nanotubes, relative to total nanocomposite weight.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably less than 0.01 wt. % inevitable traces carbon dots, relative to total nanocomposite weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % AgBr, relative to the total metal oxide weight.

The nanocomposite no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % tungsten oxide, relative to a total nanocomposite weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % Co, relative to total nanocomposite weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or together, of CuO and $WO_3$, relative to total nanocomposite weight.

The nanocomposite no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % elemental state metal, relative to total nanocomposite weight. The elemental metal may be Co and Fe, e.g., as either or both excluded.

The nanocomposite obtained may include no more than 0.1, 0.075, 0.05, 0.025, 0.01, 0.005, 0.001, 0.0001, or 0.00001 wt. % of any noble metal, preferably no more than 0.09 wt. %, preferably no more than 0.08 wt. %, preferably no more than 0.07 wt. %, preferably no more than 0.06 wt. %, preferably no more than 0.05 wt. %, preferably no more than 0.04 wt. %, preferably no more than 0.03 wt. %, preferably no more than 0.02 wt. %, preferably no more than 0.01 wt. %, preferably no more than 0.005 wt. %, and preferably no more than 0.001 wt. %, relative to total nanocomposite weight.

The nanocomposite obtained may include no more than 10, 7.5, 5, 4, 3, 2, 1, 0.75, 0.5, 0.25, 0.1, 0.01, 0.001, 0.0001, or 0.00001 wt. % MgO, preferably no more than 9 wt. % MgO, preferably no more than 8 wt. % MgO, preferably no more than 7 wt. % MgO, preferably no more than 6 wt. % MgO, preferably no more than 5 wt. % MgO, preferably no more than 4 wt. % MgO, preferably no more than 3 wt. % MgO preferably no more than 2 wt. % MgO, and preferably no more than 1 wt. % MgO, relative to a total metal oxide weight. The nanocomposite may include no clay.

The nanocomposite may include no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably less than 0.01 wt. % of carbonaceous materials besides graphitic $C_3N_4$. A low concentration of carbonaceous material can contribute to maintaining the desired structural integrity and functional properties of the nanocomposite. The minimal amount of additional carbon material can prevent or reduce significant interference with the performance of the graphitic carbon nitride, particularly in applications such as photocatalysis or energy storage, where the purity and specific properties of the g-$C_3N_4$ are crucial.

The carbon materials in the nanocomposite may include no nanotubes, relative to total nanocomposite weight, e.g., no more than 5, 4, 3, 2.5, 2, 1, 0.5, 0.1, 0.01, 0.001, 0.0001, or 0.00001 wt. %, relative to total nanocomposite carbonaceous material weight, of nanotubes (and/or nanorods). The graphitic $C_3N_4$ may optionally not be nitrogen deficient. The carbon materials in the nanocomposite may include no more than 0.01, 0.0075, 0.005, 0.0025, 0.001, 0.0001, or 0.00001 wt. %, individually or in combination, of nanotubes and no nanorods, relative to total nanocomposite weight.

The nanocomposite obtained may include no more than 1, 0.75, 0.5, 0.25, 0.1, 0.01, 0.001, 0.0001, or 0.00001 atoms of Ce, preferably no more than 0.9 atoms of Ce, preferably no more than 0.8 atoms of Ce, preferably no more than 0.7 atoms of Ce, preferably no more than 0.6 atoms of Ce, preferably no more than 0.5 atoms of Ce, preferably no more than 0.4 atoms of Ce, preferably no more than 0.3 atoms of Ce, preferably no more than 0.2 atoms of Ce, preferably no more than 0.1 atoms of Ce, preferably no more than 0.05 atoms of Ce, and preferably no more than 0.01 atoms of Ce, relative to 100 atoms of Mn.

The nanocomposite obtained may include no more than 10, 7.5, 5, 4, 3, 2, 1, 0.5, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.5 wt. %, and preferably no more than 0.1 wt. % $Mn_3O_4$, relative to total manganese oxide weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % $VO_4$, relative to total vanadium-oxide weight. The nanocomposite may include no more than 1, 0.75, 0.5, 0.25, 0.1, 0.01, 0.001, 0.0001, or 0.00001 wt. % V-doped ZnO, relative to total nanocomposite weight.

The nanocomposite obtained may include no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. %, individually or in any combination, of $K_2Ti_8O_{17}$, $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and/or $LaFeO_3$, relative to a total metal oxide weight.

The nanocomposite may include no more than 10, 7.5, 5, 4, 3, 2, 1, 0.5, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.5 wt. %, and preferably no more than 0.1 wt. % metal content, relative to total metal content. The metal may exclude or include Zn, Ce, Gd, La, Ba, Ti, Ca, Sr, Zr, Pb, Ni, Ag, Pt, Co, Cu, Mn, Cd, Ta, Nb, Pr, and/or Bi. Excessive metal accumulation could negatively impact the nanocomposite's stability, reactivity, or selectivity. By limiting the metal content, the nanocomposite maintains a high level of performance in its intended applications, ensuring that the active sites of the carrier material remain unblocked or inhibited, thus enhancing its long-term durability, minimizing unwanted side reactions, and preserving its efficiency in processes like catalysis or energy conversion.

The nanocomposite may include no more than 1, 0.75, 0.5, 0.25, 0.1, 0.01, 0.001, 0.0001, or 0.00001 wt. % of $SiO_2$, $TiO_2$, ZnO, and/or ZnS, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % of $SiO_2$, $TiO_2$, ZnO, and/or ZnS, individually or in any combination.

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 nm, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT).

The Brunauer-Emmett-Teller (BET) surface area of the nanocomposite may be in a range of from 16.2 to 20.2 square meters per gram ($m^2/g$), preferably 16.5 to 20 $m^2/g$, and preferably 18 $m^2/g$. The surface area on the nanocomposite may be 18.7±3.33, 2.5, 2, 1.5, 1, 0.75, 0.67, 0.5, 0.33, 0.25, 0.125, 0.1, 0.05, or 0.01 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. The pore diameter, pore volume, and BET surface area may be measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad, and Gaussian. The average pore distribution of nanocomposite may be unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

The average pore diameter of the nanocomposite, according to Barrett-Joyner-Halenda (BJH) measurement method, may be in a range of from 5 to 15 nm, preferably 6 to 14 nm, preferably 7 to 13 nm, preferably 8 to 12 nm, and preferably 9 to 11 nm. The nanocomposite may have an average pore diameter of 8.34±2.5, 2, 1.5, 1, 0.75, 0.67, 0.5, 0.33, 0.25, 0.125, 0.1, 0.05, or 0.01 nm.

The average pore volume of the nanocomposite, according to the BJH measurement method, may be in a range of from 0.025 to 0.075 $cm^3/g$, preferably 0.04 to 0.06 $cm^3/g$, preferably 0.05 to 0.065 $cm^3/g$, and preferably 0.055 to 0.07 $cm^3/g$. The average pore volume of the nanocomposite may be 0.05±0.01, 0.0075, 0.005, 0.0025, 0.001, 0.0001, or 0.00001 $cm^3/g$.

The mass relationship of the nanocomposite may be in a range of from 9 to 11:4 to 6:84 to 86, and preferably 9.5 to 10.5:4.5 to 5.5:84.5 to 85.5. The mass relationship of the nanocomposite may be 10:5:85, while tolerable variations of any of these values may be ±2.5, 2, 1.5, 1, 0.75, 0.5, 0.25, 0.1, 0.5, or 0.1.

The nanocomposite may have a (220) spinel interplanar spacing in a range of from 0.258 to 0.338 nm, preferably 0.260 to 0.275 nm, preferably 0.275 to 0.300 nm, and preferably 0.275 to 0.330 nm, according to selected area electron diffraction (SAED). The nanocomposite may have a (400) spinel interplanar spacing in a range of from 0.165 to 0.245 nm, preferably 0.165 to 0.230 nm, preferably 0.170 to 0.210 nm, and preferably 0.180 to 0.240 nm, according to SAED. The nanocomposite may have a (002) $MnO_2$ interplanar spacing in a range of from 0.106 to 0.186 nm, preferably 0.130 to 0.185 nm, preferably 0.150 to 0.175 nm, and preferably 0.170 to 0.180 nm, according to SAED. The nanocomposite may have a (211) $Al_2O_3$ interplanar spacing in a range of from 0.093 to 0.173 nm, preferably 0.097 to 0.157 nm, preferably 0.107 to 0.147 nm, and preferably 0.117 to 0.167 nm, according to SAED.

The nanocomposite may have a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to SAED.

The XRD spectrum of the nanocomposite under Cu-filtered CuKα radiation (1.5418 Å) powered at 45 kilovolt (kV) and 10 milliampere (mA) may have 2θ peaks of a $MnO_2$ pyrolusite phase at 28.4±1, 40.5±1, 44.9±1, 56.0±1, 66.4±1, and/or 79.1±1°, a $MgAl_2O_4$ spinel phase at 19.1±1, 31.3±1, 44.8±1, 56.1±1, 59.5±1, 74.09±1, and/or 78.1±1°, a MgO cubic phase at 42.8±1, 62.2±1, and 74.6±1°, a $Al_2O_3$ phase at 31.3±1, 34.3±1, and/or 61.6±1°, and/or g-$C_3N_4$-related diffractions at 18.8±1, 28.2±1, 35.5±1, 40.7±1, 44.6±1, and/or 73.7±1°. No more than 5, 4, 3.33, 2.5, 2, 1.5, 1, 0.75, 0.67, 0.5, 0.33, 0.25, 0.125, 0.1, 0.05, or 0.01% relative intensity (or none) of any other phase may be detected in the XRD spectrum. The $MgAl_2O_4$ spinel is represented by diffractions at 2θ values of 44.8, 56.1, 59.5, 74.09, 78.1, 19.1, and/or 31.3°. At 2θ values of 42.8, 62.2, and/or 74.6°, the cubic phase of MgO may be detected. At 2θ values of 28.4, 40.5, 44.9, 56.0, 66.4, and/or 79.1°, pyrolusite phase of $MnO_2$ may be detected. At 2θ values of 18.8, 28.2, 35.5, 40.7, 44.6, and/or 73.7° g-$C_3N_4$-related diffractions may be detected.

$MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse."

The spinel phase with the chemical formula $MgAl_2O_4$ is a mineral type of this oxide family. $MgAl_2O_4$ can be used in various applications, such as in metallurgical, electrochemical, radio-technical, and chemical industrial fields owing to its high thermal stability (melting point at 2135° C.), high hardness (16 gigapascal (GPa)), high mechanical resistance, high resistance against chemical attack, wide band gap energy, high electrical resistivity, relatively low thermal expansion coefficient (9.10$^{-6}$ 1/° C.) between 3° and 1400° C., low dielectric constant, low density (3.58 gram per cubic centimeter (g/cm$^3$)), high thermal shock resistance, hydrophobicity, and low surface acidity.

The nanocomposite may consist essentially of sheet morphologies, preferably nanosheets (i.e., such that the bandgap is no more than 5% different from a pure sheet morphology nanocomposite), although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. The nanocomposite may have a structure including a dispersion of homogeneous spherical metal oxide nanoparticles on a two-dimensional porous structure, including curled and wrinkled nanosheets and platelets of the g-$C_3N_4$. The graphitic $C_3N_4$ in the nanocomposite may include no more than inevitable traces of boron, e.g., no more than 5, 4, 3, 2.5, 2, 1, 0.5, 0.1, 0.01, 0.001, 0.0001, or 0.00001 wt. %, relative to total nanocomposite weight or total carbonaceous component in the nanocomposite, of boron. The nanocomposite may include no clay, e.g., no more than 5, 4, 3, 2.5, 2, 1, 0.5, 0.1, 0.01, 0.001, 0.0001, or 0.00001 wt. %, relative to total nanocomposite weight or total carbonaceous component in the nanocomposite, of clay.

The nanocomposite may have a bandgap energy in the range of 2.5 to 3.3 eV, preferably 2.7 to 3.0 eV, preferably 2.8 to 3.1 eV, preferably 2.9 to 3.1 eV, preferably 2.95 to 3.2 eV, preferably 3.0 to 3.3 eV. The nanocomposite may have a bandgap energy of 2.9±0.67, 0.5, 0.33, 0.25, 0.125, 0.1, 0.05, or 0.01 eV.

A method of photodegrading an organic compound may include irradiating, in the presence of the organic compound, a nanocomposite comprising graphitic $C_3N_4$, $MnO_2$, and $MgAl_2O_4$ in a mass relationship to each other in a range of from 5 to 15:2 to 7:75 to 95, at a temperature in a range of from 10 to 80° C. in a contaminated volume of water.

The irradiation may occur at a temperature in a range of from 10° C. to 80° C., preferably 20° C. to 80° C., preferably 30° C. to 80° C., preferably 40° C. to 80° C., preferably 50° C. to 80° C., preferably 60° C. to 80° C., preferably 70° C. to 80° C. The irradiation occurs at a pH in a range of from 6 to 8, preferably 6, preferably 6.5, preferably 7, preferably 7.5, preferably 8. The nanocomposite may be irradiated using a source that may include, but is not limited to, the use of UV lamps to provide high-energy ultraviolet radiation, LED light sources, xenon arc lamps, laser systems, fluorescent lamps, which can be customized to emit wavelengths compatible with the nanocomposite's activation range, provide another versatile approach for irradiation. The method of irradiating the nanocomposite may include exposing the nanocomposite to sunlight under ambient temperature and pressure.

This process facilitates the partial decomposition of the organic compound, contributing to the partial decontamination of the water. The organic compound may be a dye, a phenol, a polycyclic aromatic hydrocarbon, an herbicide, a pesticide, a persistent organic contaminant, or the like, or any combination of these.

In UV-vis spectroscopy, the nanocomposite may have a highest intensity absorbance maximum in a range of from 200 to 250 UV-vis, preferably 210 to 250 UV-vis, preferably 220 to 250 UV-vis, preferably 230 to 250 UV-vis, preferably 240 to 250 UV-vis, preferably 245 to 250 UV-vis, as an absorption band spanning from less than 200 to 800 nm, preferably less than 300 to 800 nm, preferably less than 400 to 800 nm, preferably less than 500 to 800 nm, preferably less than 600 to 800 nm, preferably less than 700 to 800 nm.

The irradiating in the presence of the nanocomposite may bring about a decomposition (at least one bond rupture) of in at least 10, 25, 33, 40, 50, 60, 67, 70, 75, 80, 85, 90, 92.5, 95, 97.5, 98, 99, 99.1, 99.5, or 99.9 wt. % of a total contaminant weight (concentration) in the fluid subject to the irradiation.

The following examples are provided solely for illustration and are not to be construed as limitations of the present disclosure, as many variations thereof are possible without departing from the spirit and scope of the present disclosure.

EXAMPLES

The following examples demonstrate a method of photodegrading an organic compound via a nanocomposite. The examples are provided solely for illustration and are not to be construed as limitations of the present disclosure, as many variations thereof are possible without departing from the spirit and scope of the present disclosure.

Example 1: Fabrication of g-$C_3N_4$@$MnO_2$/$MgAl_2O_4$ (10:5:85, Wt. %) Nanocomposite According to the present disclosure, magnesium nitrate, and aluminum nitrate were added together in one beaker with manganese chloride, in predetermined amount (here, stoichiometric), to produce a 10% $MnO_2$/$MgAl_2O_4$. Further, about 10 grams (g) of menthol as fuel was added to the beaker, followed by 30 mL of distilled water. The beaker was heated till a clear solution was obtained, heated further till dryness. The product was ground in a mortar, transferred to a 150 mL porcelain dish, and calcined at 700° C. for 3.0 hours. Furthermore, the 10% $MnO_2$/$MgAl_2O_4$ product was cooled down to room temperature and weighed, ground with urea in an amount suitable (here, 2 g urea to 20 g of the 10% $MnO_2$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $MnO_2$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-$C_3N_4$@$MnO_2$/$MgAl_2O_4$ (10:5:85, wt. %) nanohybrid/nanocomposite. The quadruple mixture was returned, and heated to 600° C. for 1.0 h in a covered porcelain crucible, and subsequently, the g-$C_3N_4$@$MnO_2$/$MgAl_2O_4$ (10:5:85, wt. %) nanohybrid was collected.

Example 2: Characterization

According to the present disclosure, X-ray diffraction (XRD) was used to identify the crystalline states in each specimen studied, employing the JDX-8030 X-ray (JEOL), made in Japan. Cu-filtered Cu-Kα radiation (1.5418 Å) powered at 45 kV and 10 mA was used to run the patterns. The specimens were tested at ambient temperatures in a range of 2θ=5° to 80°. The surface morphologies of the obtained samples were analyzed by transmission electron microscopy (TEM), selected area electron diffraction (SAED), and high-resolution transmission electron microscopy (HRTEM) images, obtained using a Tecnai-G20 (USA) transmission electron microscope with a 200 kV speed voltage. Nitrogen ($N_2$) adsorption isotherm obtained at 77 K using Micrometrics ASAP 2020 Brünauer-Emmett-Teller (BET) analyzer was used to calculate the surface characteristics, specifically the BET surface area, total pore volume (Vp), and mean pore radius (r). Before beginning the measurement, the samples were outgassed for three hours at 200° C. with a decreased pressure of $10^{-5}$ Torr. A Shimadzu UV-Vis spectrophotometer (2600i UV-Vis, Japan) was used to record UV-Vis diffuse reflectance spectra (DRS) in the 200 nanometers (nm) to 800 nm region, using the typical $BaSO_4$.

Results and Discussion

Figure 1:
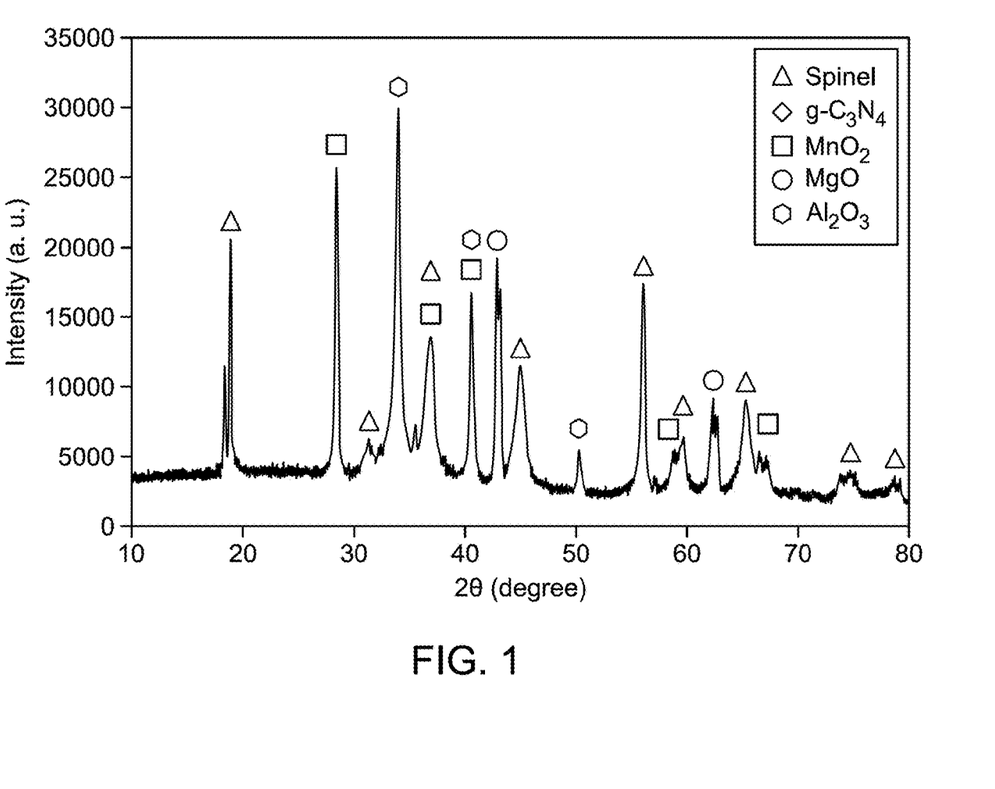
FIG. 1 is a graph depicting X-ray diffraction (XRD) patterns of an inventive g-$C_3N_4$@$MnO_2$/$MgAl_2O_4$ nanocomposite.

As mentioned above, XRD was used to examine the crystallinity and phase identification of the g-$C_3N_4$@$MnO_2$/$MgAl_2O_4$ catalyst; the results are depicted in FIG. 1. As can be seen in FIG. 1, the strong peaks indicate the high crystalline nature of the powders. The diffraction patterns are compared to the standard COD cards to demonstrate the presence of $MnO_2$, MgO, $MgAl_2O_4$, $Al_2O_3$, and g-$C_3N_4$ phases. The diffractions of $MgAl_2O_4$ spinel were recorded at 2θ values of 44.8°, 56.1°, 59.5°, 74.09°, 78.1°, 19.1°, and 31.3°. The standard COD card number 9001364 states that the diffractions originated from the (111), (220), (400), (422), (511), (620), and (622) planes, respectively. The MgO (COD card, No. 9000499) showed a cubic phase at 2θ values of 42.8°, 62.2°, and 74.6°. The (200), (220), and (311), respectively, are represented by these lines. It was previously reported that MgO was present together with the $MgAl_2O_4$ spinel phase. The Pyrolusite phase of $MnO_2$ (COD No. 2105790) is closely matched with the diffraction lines observed at 28.4°, 40.5°, 44.9°, 56.0°, 66.4°, and 79.1°. According to COD No. 1534042, the g-$C_3N_4$ diffractions were detected at 18.8°, 28.2°, 35.5°, 40.7°, 44.6°, and 73.7°. At 31.3°, 34.3°, and 61.6°, $Al_2O_3$ traces were detected (COD No. 4002418). There were no further phases found, suggesting that g-$C_3N_4$@$MnO_2$/$MgAl_2O_4$ was successfully fabricated.

Figure 2A:
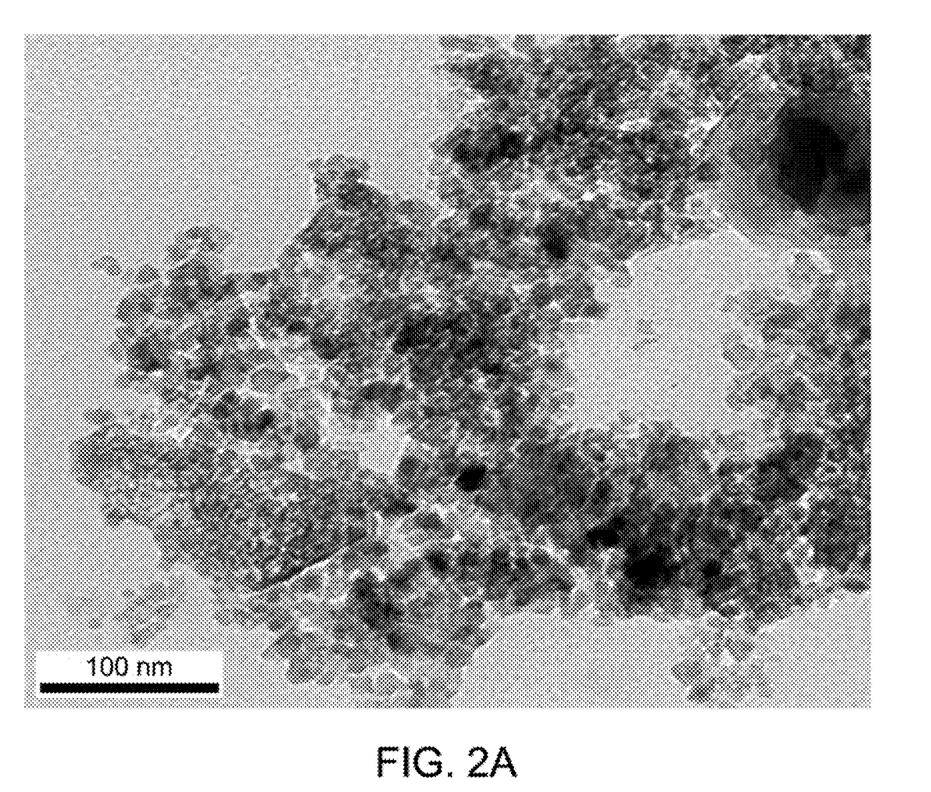
FIG. 2A is a transmission electron microscopy (TEM) image of an inventive g-$C_3N_4$@$MnO_2$/$MgAl_2O_4$ nanocomposite.
Figure 2B:
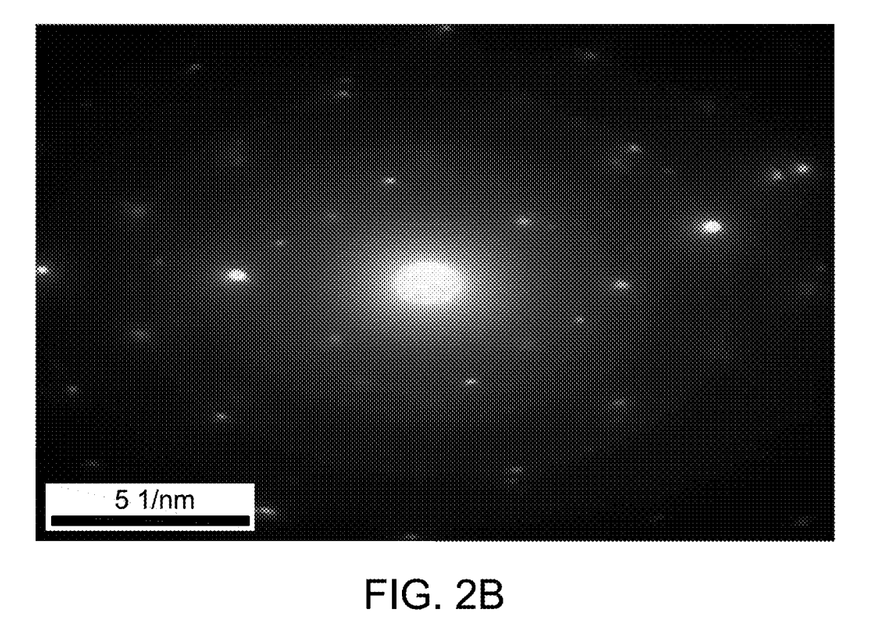
FIG. 2B depicts the selected area electron diffraction (SAED) analysis result for an inventive g-$C_3N_4$@$MnO_2$/$MgAl_2O_4$ nanocomposite.
Figure 2C:
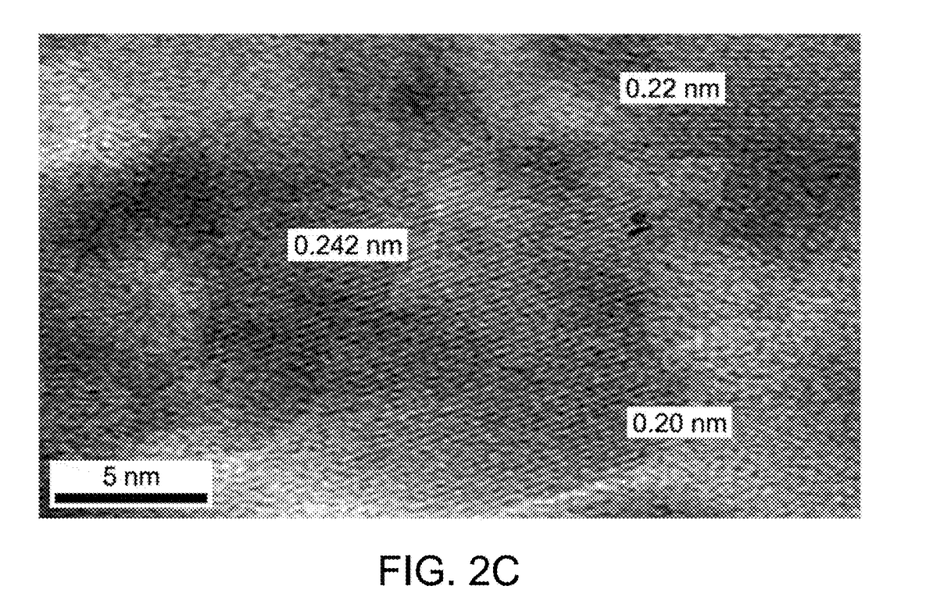
FIG. 2C is a high-resolution transmission electron microscopy (HRTEM) image of an inventive g-$C_3N_4$@$MnO_2$/$MgAl_2O_4$ nanocomposite.
Figure 2D:
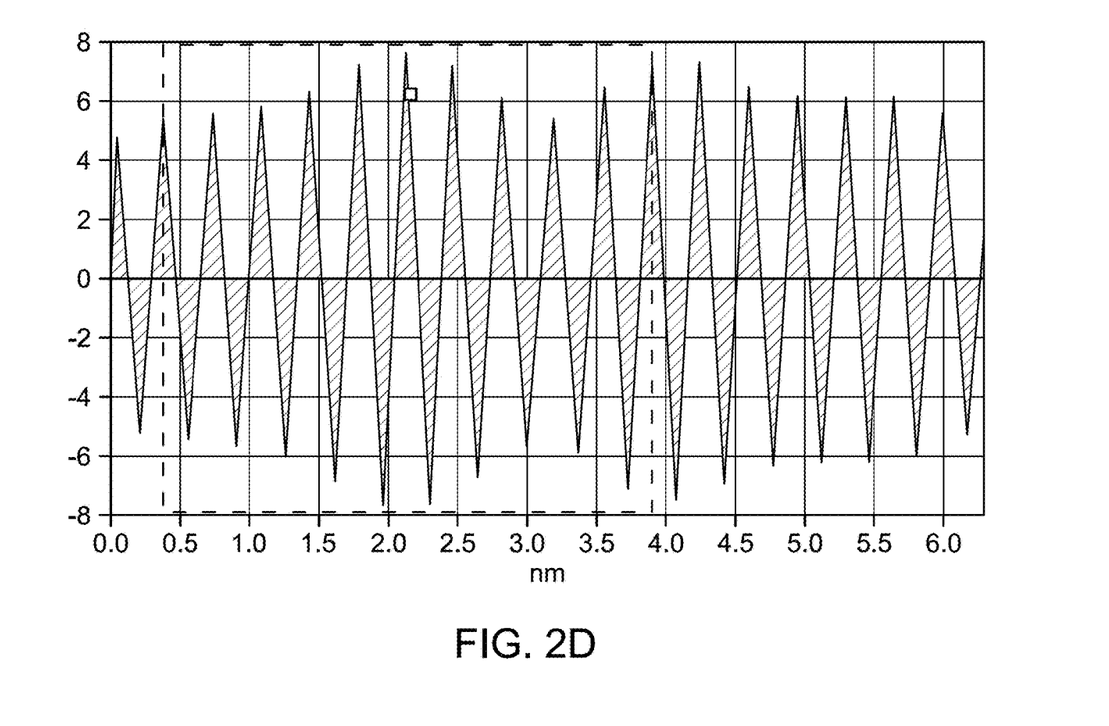
FIG. 2D is a fast Fourier transform (FFT) spectra of an inventive g-$C_3N_4$@$MnO_2$/$MgAl_2O_4$ nanocomposite.
Figure 2E:
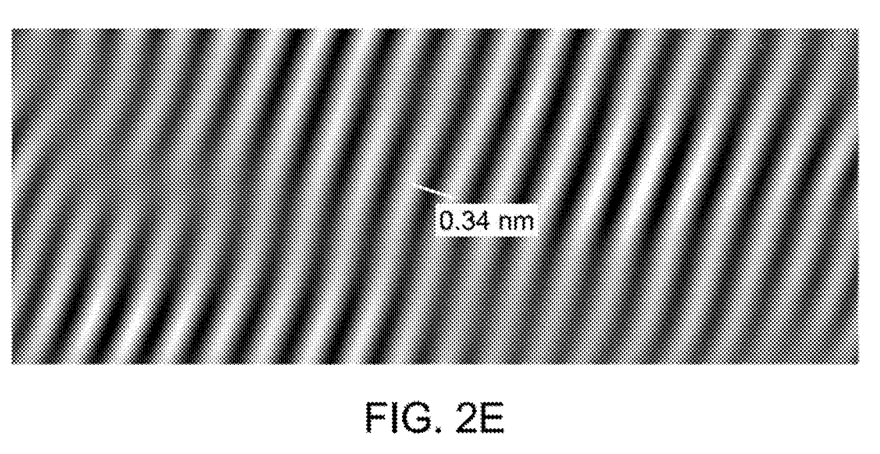
FIG. 2E is an inverse fast Fourier transform (IFFT) spectra of an inventive g-$C_3N_4$@$MnO_2$/$MgAl_2O_4$ nanocomposite.

Further, TEM images of g-$C_3N_4$@$MnO_2$/$MgAl_2O_4$ nanocomposite are shown in FIG. 2A. The TEM image shows the dispersion of homogeneous spherical metal oxides nanoparticles with size 7.9 nm on two-dimensional porous structure constructed with curled and wrinkled nanosheets and platelets of the g-$C_3N_4$. The corresponding SAED pattern of the nanocomposite, as shown in FIG. 2B, reveals diffraction spots with interplanar spacing of 0.298 nm, 0.205 nm, 0.146 nm, and 0.133 nm due to (220, spinel), (400, spinel), (002, $MnO_2$), and (211, $Al_2O_3$) diffraction planes, respectively. The corresponding HRTEM of the nanocomposite, as depicted in FIG. 2C, shows a plane spacing of 0.242 nm and 0.20 nm related to (311), and (400) planes of spinel, and 0.22 nm related to (200) plane of $MnO_2$, characterizing the heterostructure formation. The fast Fourier transform (FFT) and inverse fast Fourier transform (IFFT) measurements, as depicted in FIGS. 2D-2E, show a 'd' value of 0.34 nm given to g-$C_3N_4$@$MnO_2$/$MgAl_2O_4$ nanocomposite, signifying the lattice spacing of (002), indicating the development of spinel structure.

Figure 3A:
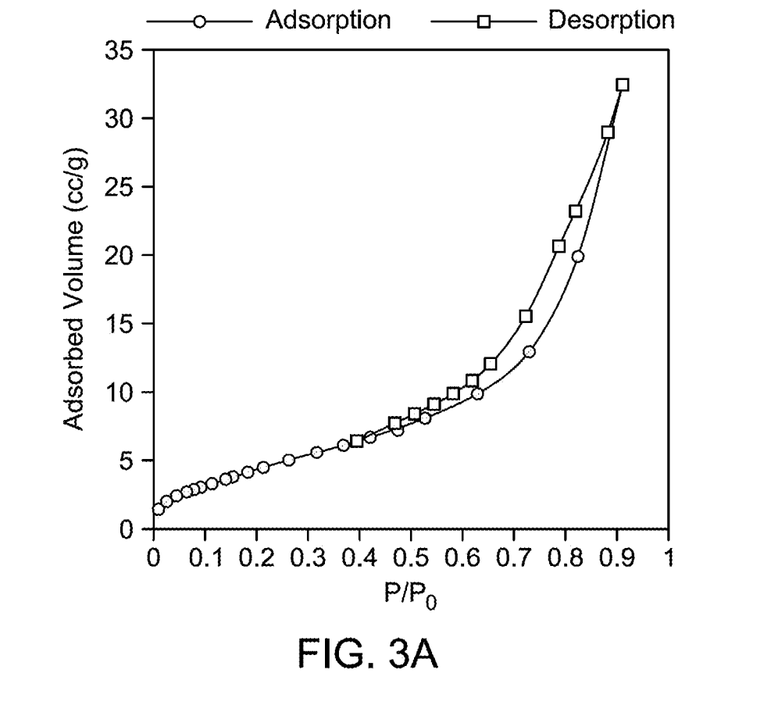
FIG. 3A is a graph depicting nitrogen adsorption-desorption isotherm of an inventive g-$C_3N_4$@$MnO_2$/$MgAl_2O_4$ nanocomposite.
Figure 3B:
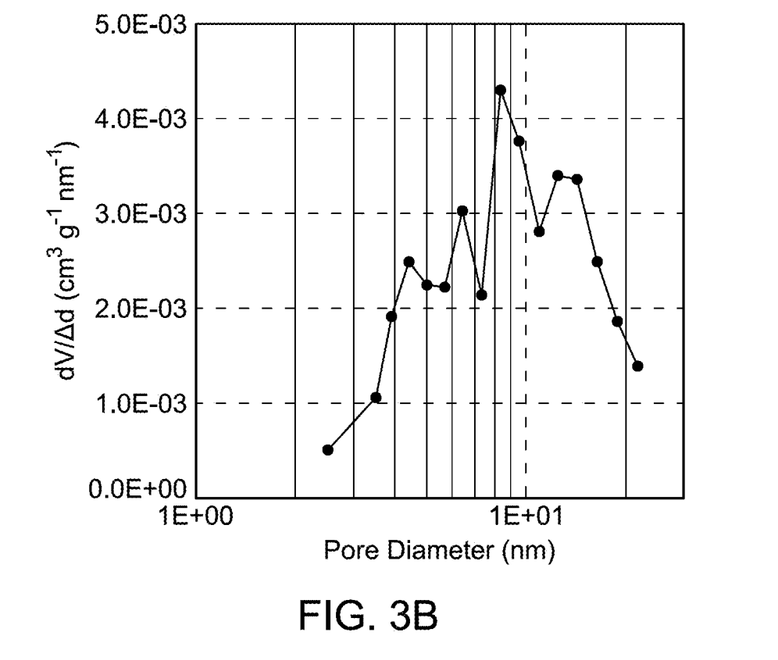
FIG. 3B is a graph depicting the pore size distribution of an inventive g-$C_3N_4$@$MnO_2$/$MgAl_2O_4$ nanocomposite.

According to the present disclosure, FIGS. 3A-3B shows the nitrogen adsorption-desorption isotherms of g-$C_3N_4$@$MnO_2$/$MgAl_2O_4$ nanocomposite. The nitrogen sorption isotherm of the composite relates to type IV with clear hysteresis loop, indicating the formation of mesoporous structures. However, shifting the loop to a relatively lower pressure (P/P°=0.39 to 1) suggests a decrease in the size of the mesopores, which may result from the deposition of metal oxides particles in the wide pores of g-$C_3N_4$. Furthermore, the BET surface area of the g-$C_3N_4$@$MnO_2$/$MgAl_2O_4$ sample was calculated to be 18.7 $m^2$/g. The marked high specific surface area reflects the good dispersion of the aforementioned metal oxides nanoparticles on g-$C_3N_4$. Moreover, the pore size distribution curves, plotted using the BJH method, for the g-$C_3N_4$@$MnO_2$/$MgAl_2O_4$ sample exhibited unimodal distribution with average pore diameters maximized at 8.34 nm and pore volume of 0.05 $cm^3$/g. The isotherm belongs to the category H3 type of pores, which do not exhibit limiting adsorption at high P/P° and may arise due to aggregation of plate-like particles giving rise to slit-shaped pores. The aforementioned observation indicates that the assembly of g-$C_3N_4$@$MnO_2$/$MgAl_2O_4$ composite provoked a mesoporous array.

The utilization of the wide-range visible-light-region in photocatalytic processes require a low bandgap of about 1.77 electron volts (eV) to 1.92 eV, as a candidate for visible light absorption and utilization for the photocatalytic purposes, as described by Li and coworkers in *J. Mol. Catal. A* 2011, 334(1-2), 116-122, which is incorporated by reference herein. Visible-light induced photocatalyst was used to displace harmful ultraviolet light with the safe-visible light. The absorbance of the prepared 10% g-$C_3N_4$@$MnO_2$/$MgAl_2O_4$ was measured in the range of 200 nm to 800 nm.

Figure 4A:
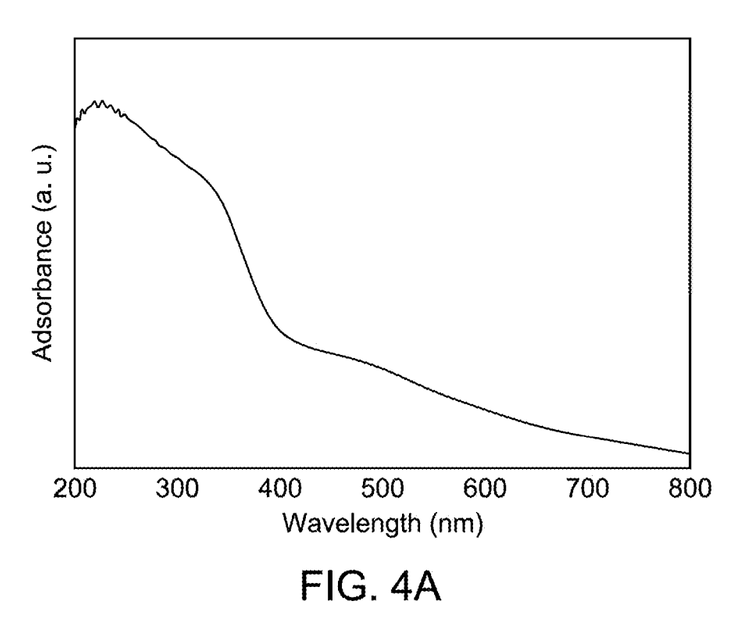
FIG. 4A is a graph depicting ultraviolet visible (UV-vis) diffuse reflectance spectra (DRS) of an inventive g-$C_3N_4$@$MnO_2$/$MgAl_2O_4$ nanocomposite.
Figure 4B:
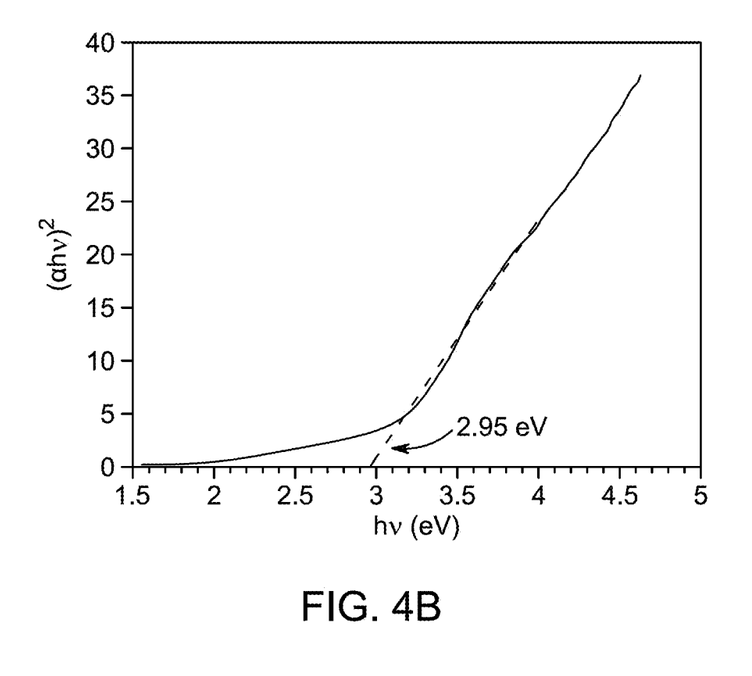
FIG. 4B is a graph depicting the band hap energy corresponding to the DRS of an inventive g-$C_3N_4$@$MnO_2$/$MgAl_2O_4$ nanocomposite.

It may be noted that when the $MnO_2$/$MgAl_2O_4$ was incorporated with g-$C_3N_4$, absorption of the nanocomposite in the visible area progressively increased. A difference between the band gap energies of $MnO_2$/$MgAl_2O_4$ and bare g-$C_3N_4$ may be the cause of the above occurrence. A Tauc plot was employed in determining the bandgap-energy ($E_g$) for the synthesized nanocomposite, as depicted in equation below.

$$\alpha h\gamma = A(h\gamma - E_g)^n$$

where, 'h' represents the Plank constant, 'α' and 'γ' are the absorption coefficient and photonic frequency, as described by Cheng and coworkers in *Langmuir* 2010, 26(9), 6618-6624, which is incorporated by reference herein. By calculating the power of 'n', a value of n=½ was revealed to propose a direct permissible transition.

As shown in FIGS. 4A and 4B, the $E_g$ was estimated to be about 2.9 eV, corresponding to the 10% g-$C_3N_4$@$MnO_2$/$MgAl_2O_4$ composite. The reduced band gap of the 10% g-$C_3N_4$@$MnO_2$/$MgAl_2O_4$ nanocomposite and more response to the visible light were caused by the insertion of metal oxides nanoparticles on g-$C_3N_4$, thus more efficient utilization of solar energy was achieved, and the improved photocatalytic activity of the 10% g-$C_3N_4$@$MnO_2$/$MgAl_2O_4$ composite was anticipated. The estimated band gap typical that of BiOI is known for its high activities in degrading organic compounds under visible light, as described by Mehrali-Afjani, et al., in *Chem. Phys. Lett.* 2020, 759, 137873; Jeevanantham and colleagues in *J. Iranian Chem. Soc.* 2019, 16(2), 243-251; Sabonian and colleagues in *Iranian J. Catal.* 2019, 9(3), 201-211; and Zeng and coworkers in *J. Colloid Interf. Sci.* 2019. 539, 563-574, each of which is incorporated by reference herein.

The aspects of the present disclosure provide the method of photodegrading an organic compound using the nanocomposite as described herein. The utilization of the wide-range visible-light-region in photocatalytic processes requires a low bandgap of 1.77 eV to 2.8 eV as a candidate for visible light absorption and utilization for photocatalytic purposes. The catalyst was well characterized via tools such as XRD, TEM, BET, and visible-UV absorbance. Both surface texturing and optical band gaps were evaluated to determine the extent of their potential use in photocatalysis and removal of pollutants.

Numerous modifications and variations of the present disclosure are possible in light of the above teachings. It is therefore to be understood that within the scope of the appended claims, the invention may be practiced otherwise than as specifically described herein.

The invention claimed is:

1. A method of photodegrading an organic compound, the method comprising:
    irradiating, in the presence of the organic compound, a nanocomposite comprising graphitic $C_3N_4$, $MnO_2$, and $MgAl_2O_4$ in a mass relationship to each other in a range of from 5 to 15:2 to 7:75 to 95, at a temperature in a range of from 10 to 80° C. in a contaminated volume of water, thereby photodegrading the organic compound to partially decompose the organic compound and at least partially decontaminate the contaminated volume of water,
    wherein the nanocomposite has a (220) spinel interplanar spacing in a range of from 0.258 to 0.338 nm, (400) spinel interplanar spacing in a range of from 0.165 to 0.245 nm, (002) $MnO_2$ interplanar spacing in a range of from 0.106 to 0.186 nm, and (211) $Al_2O_3$ interplanar spacing in a range of from 0.093 to 0.173 nm, according to selected area diffraction.

2. The method of claim 1, wherein the average pore distribution of the nanocomposite is unimodal, and
    wherein a BET specific surface area of the nanocomposite is in a range of from 16.2 to 20.2 m²/g, and/or
    wherein an average pore diameter of the nanocomposite, according to BJH measurement method, is in a range of from 5 to 15 nm, and/or
    wherein an average pore volume of the nanocomposite, according to the BJH measurement method, is in a range of from 0.025 to 0.075 cm³/g.

3. The method of claim 1, wherein the mass relationship of the nanocomposite is in a range of from 9 to 11:4 to 6:84 to 86,
    wherein the nanocomposite has a (220) spinel interplanar spacing of 0.298±2% nm, (400) spinel interplanar spacing of 0.205±2% nm, (002) $MnO_2$ interplanar spacing of 0.146±2% nm, and (211) $Al_2O_3$ interplanar spacing of 0.133±2% nm, according to selected area diffraction,
    wherein an XRD spectrum of the nanocomposite under Cu-filtered Cu-Kα radiation (1.5418 Å) powered at 45 kV and 10 mA has 2θ peaks of
    an $MnO_2$ pyrolusite phase at 28.4±1, 40.5±1, 44.9±1, 56.0±1, 66.4±1, and 79.1±1°,
    an $MgAl_2O_4$ spinel phase at 19.1±1, 31.3±1, 44.8±1, 56.1±1, 59.5±1, 74.09±1, 78.1±1°,
    an MgO cubic phase at 42.8±1, 62.2±1, and 74.6±1°,
    an $Al_2O_3$ phase at 31.3±1, 34.3±1, and 61.6±1°,
    g-$C_3N_4$-related diffractions at 18.8±1, 28.2±1, 35.5±1, 40.7±1, 44.6±1, and 73.7±1°, and
    wherein no more than 5% relative intensity of any other phase is detected in the XRD spectrum.

4. The method of claim 1, wherein the irradiating comprises exposing the nanocomposite to sunlight under ambient temperature and pressure,
    wherein the nanocomposite has a highest intensity absorbance maximum in a range of from 200 to 250 nm within an absorption band spanning from less than 200 to more than 800 nm as measured by UV-vis spectroscopy, and
    wherein the nanocomposite has a bandgap energy in a range of from 2.5 to 3.3 eV.

5. The method of claim 1, wherein the nanocomposite has no more than 0.1 parts, individually, of thiol, amine, carboxylate, and hydroxyl functionalization per 100 $MnO_2$ units, relative to a total metal oxide weight.

6. The method of claim 1, wherein the nanocomposite comprises no more than 1 wt. %, individually, of $TiO_2$, $Ti_2AlN$, $Fe_3O_4$, AlN, ZnO, and $SiO_2$, relative to a total metal oxide weight.

7. The method of claim 1, wherein the nanocomposite comprises no more than 1 atom of Ce, relative to 100 atoms of Mn.

8. The method of claim 1, wherein carbon materials in the nanocomposite comprise no more than 1 wt. %, individually, carbon nanotubes or carbon dots, relative to total nanocomposite weight.

9. The method of claim 1, wherein the nanocomposite no more than 1 wt. % AgBr, relative to a total metal oxide weight, and
    wherein the nanocomposite no more than 1 wt. % tungsten oxide, relative to a total nanocomposite weight.

10. The method of claim 1, wherein the nanocomposite comprises no more than 1 wt. % Co, relative to total nanocomposite weight.

11. The method of claim 1, wherein the nanocomposite comprises no more than 1 wt. %, individually, CuO and $WO_3$, relative to total nanocomposite weight.

12. The method of claim 1, wherein the nanocomposite comprises no more than 1 wt. %, individually, elemental state Co and Fe, relative to total nanocomposite weight.

13. The method of claim 1, wherein the nanocomposite comprises no more than 0.1 wt. % of any noble metal, relative to total nanocomposite weight.

14. The method of claim 1, wherein the nanocomposite comprises no more than 10 wt. % MgO, relative to a total metal oxide weight, and
    wherein the nanocomposite comprises no clay.

15. The method of claim 1, wherein the nanocomposite comprises no more than 10 wt. % $Mn_3O_4$, relative to total manganese oxide weight, and
    wherein the nanocomposite comprises no more than 1 wt. % V-doped ZnO, relative to total nanocomposite weight.

16. The method of claim 1, wherein, relative to a total metal oxide weight, the nanocomposite comprises no more than 1 wt. %, individually, of $K_2Ti_8O_{17}$, $Al_2O_3$, ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $Gd_2FeCrO_6$, $KTaO_3$, $NaTaO_3$, $NaNbO_3$, $KNbO_3$, $Pr_2Ti_2O_7$, $SiO_2$, $TiO_2$, ZnO, ZnS, $Bi_4O_5I_2$, $SrFe_{0.5}Ta_{0.5}O_3$, $NaNbO_3$, and $LaFeO_3$.

17. The method of claim 1, wherein the graphitic $C_3N_4$ in the nanocomposite consists essentially of sheet morphologies, and
    wherein the graphitic $C_3N_4$ in the nanocomposite comprises no more than inevitable traces of boron.

18. The method of claim 1, wherein the nanocomposite comprises no more than 10 wt. %, individually, relative to total metal content, of any of Zn, Ce, Gd, La, Ba, Ti, Ca, Sr, Zr, Pb, Ni, Ag, Au, Co, Cu, Mn, Cd, W, Ta, Nb, Pr, and Bi, and wherein the nanocomposite comprises no more than 1 wt. %, individually, relative to total carrier weight, of $SiO_2$, $TiO_2$, ZnO, and ZnS.

* * * * *